United States Patent
Ahn et al.

(10) Patent No.: US 9,310,647 B2
(45) Date of Patent: Apr. 12, 2016

(54) LIQUID CRYSTAL DISPLAY APPARATUS HAVING REINFORCEMENT

(71) Applicant: SAMSUNG ELECTRONICS CO., LTD., Suwon-si (KR)

(72) Inventors: Joon-seok Ahn, Suwon-si (KR); Jae-hyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 349 days.

(21) Appl. No.: 13/871,623

(22) Filed: Apr. 26, 2013

(65) Prior Publication Data
US 2013/0314638 A1  Nov. 28, 2013

(30) Foreign Application Priority Data

May 25, 2012 (KR) .................. 10-2012-0056184
Nov. 12, 2012 (KR) .................. 10-2012-0127641

(51) Int. Cl.
G02F 1/1335 (2006.01)
G02F 1/1333 (2006.01)
F21V 8/00 (2006.01)

(52) U.S. Cl.
CPC ........ *G02F 1/133608* (2013.01); *G02B 6/0093* (2013.01); *G02F 1/133308* (2013.01); *G02B 6/0085* (2013.01); *G02F 2001/133314* (2013.01); *G02F 2201/50* (2013.01); *G02F 2201/503* (2013.01)

(58) Field of Classification Search
CPC .......... G02F 2201/50; G02F 2201/503; G02F 2201/54; G02F 1/133608; G02F 1/133308; G02F 2001/133314; G02B 6/0093
USPC ........................................... 349/60
See application file for complete search history.

(56) References Cited

U.S. PATENT DOCUMENTS

| | | | |
|---|---|---|---|
| 7,133,281 B2* | 11/2006 | Bae | ............ 361/679.21 |
| 8,142,049 B2* | 3/2012 | Cho | ............ 362/217.1 |
| 2001/0012812 A1 | 8/2001 | Spengler | |
| 2009/0316062 A1 | 12/2009 | Nishizawa | |
| 2011/0007236 A1 | 1/2011 | Kim et al. | |
| 2011/0090426 A1 | 4/2011 | Choi et al. | |
| 2011/0310538 A1 | 12/2011 | Abe et al. | |

FOREIGN PATENT DOCUMENTS

| | | |
|---|---|---|
| EP | 2610667 A1 | 7/2013 |
| JP | 2008276035 A | 11/2008 |

(Continued)

OTHER PUBLICATIONS

International Search Report, dated Aug. 14, 2013, issued by the International Searching Authority, in counterpart Application No. PCT/KR2013/002918.

(Continued)

*Primary Examiner* — Paisley L Arendt
(74) *Attorney, Agent, or Firm* — Sughrue Mion, PLLC (57) ABSTRACT

A liquid crystal display is provided. The liquid crystal display includes a liquid crystal panel which is configured to display an image; a backlight which is configured to supply light for displaying the image on the liquid crystal panel; a top chassis and bottom chassis which package the liquid crystal panel and backlight unit in one module; and a strength reinforcing member which is mounted to an internal surface of the bottom chassis to reinforce a strength of the bottom chassis.

15 Claims, 11 Drawing Sheets

(56) References Cited

FOREIGN PATENT DOCUMENTS

| | | | |
|---|---|---|---|
| JP | 2008288047 A | 11/2008 | |
| JP | 2009244668 A | 10/2009 | |
| KR | 1020120018979 A | 3/2012 | |
| WO | 2011024254 A1 | 3/2011 | |

OTHER PUBLICATIONS

Communication, dated Aug. 16, 2013, issued by the European Patent Office, in counterpart Application No. 13168931.7.

Written Opinion, dated Aug. 14, 2013, issued by the International Searching Authority, in counterpart Application No. PCT/KR2013/002918.

\* cited by examiner

LIQUID CRYSTAL DISPLAY APPARATUS HAVING REINFORCEMENT

CROSS-REFERENCE TO RELATED APPLICATIONS

This application claims priority from Korean Patent Application No. 10-2012-56184 filed May 25, 2012, and Korean Patent Application No. 10-2012-0127641 filed Nov. 12, 2012, the disclosures of which are herein incorporated by reference.

BACKGROUND

1. Field

Methods and apparatuses consistent with exemplary embodiments relate to a liquid crystal display module, and more particularly, to a liquid crystal display module having improved resistance to deformation.

2. Description of the Related Art

A liquid crystal display may be provided in a flat panel or a curved panel display configuration. In either case, where the flat panel or curved panel display becomes deformed by a weight, external force, or heat etc. from a manufactured flatness or curvature, there is a disadvantage in that deterioration of the image quality of the display increases.

It has been proposed to form a beading structure on a surface of a chassis of the display to attempt to reinforce the strength of the display. However, there is a disadvantage in that such beading increases the size and weight of the display as the display becomes larger in size. Thus, as the display becomes larger in size, a beading structure becomes less and less effective in preventing deformation.

Alternatively, it has been proposed to increase a thickness of the chassis in order to prevent deformation. However, in such a case, there is a disadvantage that the manufacturing cost increases as the thickness increases, and further, the thickness and weight of the display apparatus also increases.

SUMMARY

Therefore, it is an aspect of the present disclosure to improve a strength of a chassis provided in a liquid crystal display apparatus while maintaining a relatively low manufacturing cost.

According to an aspect of an exemplary embodiment, there is provided a liquid crystal display apparatus that includes a liquid crystal panel which is configured to display an image; a backlight unit which is configured to supply light for displaying the image on the liquid crystal panel; a top chassis and bottom chassis which package the liquid crystal panel and backlight unit in one module; and a strength reinforcing member which is mounted to an internal surface of the bottom chassis.

The strength reinforcing member may have a shape of a honeycomb having a plurality of cells.

Each cell of the strength reinforcing member may have a shape of a hexagonal column.

The strength reinforcing member may have a shape of a wave.

The strength reinforcing member may have a shape of an egg carton.

The strength reinforcing member may include a plurality of convex portions and a plurality of concave portions, and a concave portion may be placed between four convex portions and a convex portion may be placed between four concave portions.

The liquid crystal display apparatus may further include a cover member which covers the strength reinforcing member.

The strength reinforcing member may be attached to the bottom chassis, and the cover member may be attached to the strength reinforcing member.

The strength reinforcing member and the bottom chassis may be attached by an adhesive, and the cover member and the strength reinforcing member may be attached by an adhesive.

The adhesive may be a hot melt adhesive.

The backlight unit may include at least one light source printed circuit board (PCB) on which a plurality of light sources are mounted, and the strength reinforcing member may be provided in a first area of the internal surface of the bottom chassis, and the at least one light source PCB may be attached to a second area of the internal surface of the bottom chassis which is not occupied by the strength reinforcing member.

A heat sink for transmitting heat generated by the light source to the bottom chassis may be provided between the light source PCB and bottom chassis.

The heat sink may be directly fastened to the top chassis.

The backlight unit may include at least one light source PCB on which a plurality of light sources are mounted, and the liquid crystal display apparatus may further include at least one heat sink that discharges heat generated by the light sources to outside, and the heat sink may be provided in a location to support the bottom chassis and light source PCB.

The heat sink may be directly fastened to the top chassis.

The liquid crystal display apparatus may further include a mid mold which assists mounting of the liquid crystal panel and backlight unit, and the heat sink may be directly fastened to the mid mold.

The strength reinforcing member may be made of aluminum.

The liquid crystal display apparatus may be applied to a large size television of 55 inches or more.

According to an aspect of another exemplary embodiment, there is provided a curved display apparatus that comprises a liquid crystal panel which is configured to display an image; a backlight unit which is configured to supply light for displaying the image on the liquid crystal panel; a top chassis and bottom chassis which package the liquid crystal panel and backlight unit in one module; and a strength reinforcing member which is attached to an internal surface of the bottom chassis.

The strength reinforcing member may have a shape of a honeycomb having a plurality of cells.

BRIEF DESCRIPTION OF THE DRAWINGS

The above and/or other aspects will be more apparent by describing exemplary embodiments with reference to the accompanying drawings, in which.

DETAILED DESCRIPTION

Certain exemplary embodiments are described in more detail below with reference to the accompanying drawings.

Figure 1:
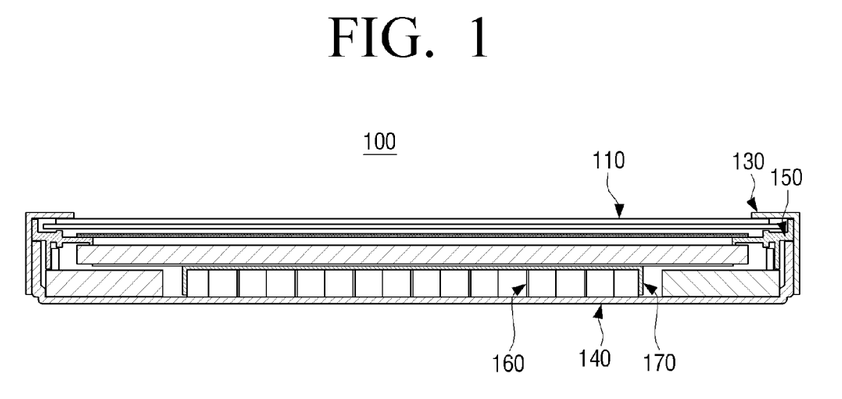
FIG. 1 is a cross-sectional view illustrating a liquid crystal display apparatus according to a first exemplary embodiment.
Figure 2:
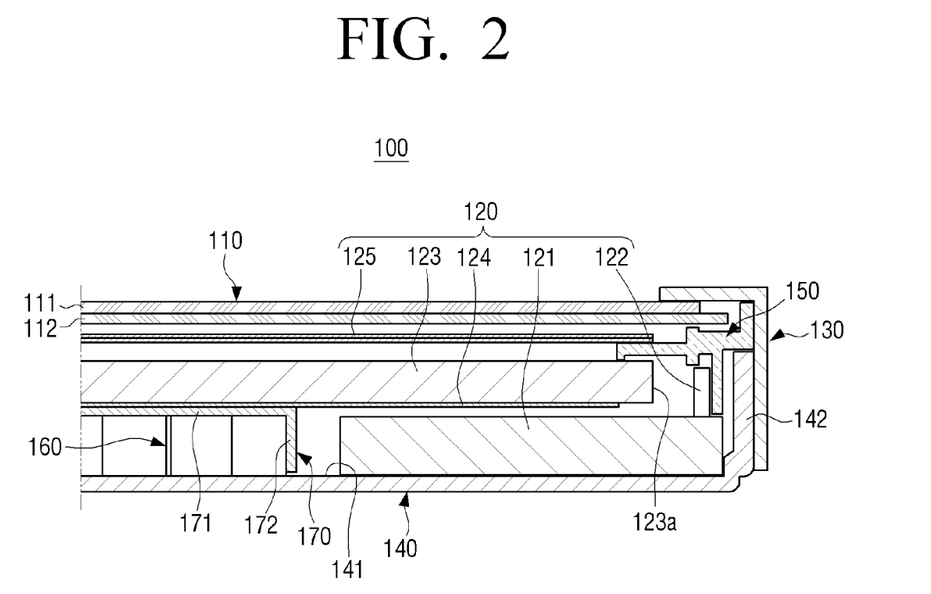
FIG. 2 is an enlarged cross-sectional view of a right end portion of the liquid crystal display apparatus illustrated in FIG. 1.

FIG. 1 is a cross-sectional view illustrating a liquid crystal display apparatus according to a first exemplary embodiment, and FIG. 2 is an enlarged cross-sectional view of a right end portion of the liquid crystal display apparatus illustrated in FIG. 1.

With reference to FIGS. 1 and 2, the liquid crystal display (LCD) apparatus 100 is applicable to various liquid crystal display apparatuses, and more particularly to a large size display apparatus, for example a television of 55 inches or more. As illustrated in FIG. 1, the liquid crystal display apparatus 100 is a type of flat panel display apparatus.

As shown in FIG. 2, the liquid crystal display apparatus 100 includes a liquid crystal panel 110, backlight unit 120, top chassis 130, bottom chassis 140 and mid mold 150.

The liquid crystal panel 110 is a component which displays an image, and includes an upper panel 111 and a lower panel 112. Between the upper panel 111 and the lower panel 112, there is placed liquid crystal (not illustrated). Although not illustrated, a front polarized filter and a color filter layer are provided in the upper panel 111, and a rear polarized filter and TFT array is provided in the lower panel 112.

According to a switching operation of the TFT array, an arrangement of liquid crystal molecules corresponding to each pixel are adjusted, thereby displaying images from the liquid crystal panel 110. An operation principle of the liquid crystal panel 110 is known, and thus further explanation thereof is omitted.

The backlight unit 120 is for providing light for displaying images on the liquid crystal panel 110. Thus, the backlight unit 120 includes at least one light source printed circuit board (light source PCB) 121, a plurality of light sources 122 mounted to each light source print circuit board 121, a light guide plate 123 placed at a rear side of the liquid crystal panel 110, a reflective sheet 124 which is placed at a rear side of the light guide plate 123, and a plurality of optical sheets 125 placed between the liquid crystal panel 110 and the light guide plate 123.

In the present exemplary embodiment, each of the light source PCBs 121 is placed on a right side and left side of the light guide plate 170 (see FIG. 1), and the plurality of light sources 122 provided in each of the light source PCB are placed to face an edge surface 123a of the light guide plate 123. For example, the light sources 122 may be provided as LEDs. The light discharged from the light sources 122 enter inside the light guide plate 123 through the edge surface 123a, and the entered light is guided to a front of the light guide plate 123 with the help of light emitting patterns (not illustrated) provided in a front surface or a rear surface of the light guide plate 123 and the reflective sheet 124 placed at a rear side of the light guide plate 123, and the guided light is provided to the liquid crystal panel 110 after the light is changed to have a further uniform brightness distribution by the optical sheets 125.

The light source PCB 121 is advantageously made of a metal material such as, for example aluminum, stainless steel, etc. of high thermal conductivity so that heat generated by the light sources 122 is well transmitted to the bottom chassis 140 which dissipates the heat and thus functions as a heat sink.

The structure of the backlight unit 120 explained hereinabove is merely an example, and thus the detailed structure of the backlight unit 120 according to other exemplary embodiments may be changed in various ways. In addition, the general structure of the backlight unit 120 is known, and thus further detailed explanation thereof is omitted.

The top chassis 130 and bottom chassis 140 house the components of the liquid display apparatus 100 which include the liquid crystal panel 110 and backlight unit 120 explained hereinabove in one module. The mid mold 150 supports components of the liquid crystal panel 110 and optical sheets 125, etc., and assists the packing of the liquid crystal apparatus 100.

The bottom chassis 140 has a coupling part 142 which is placed substantially orthogonally with respect to the liquid crystal panel 110 and backlight unit 120. Since the coupling part 142 is fastened to the top chassis 130 by a fastener such as a screw, the bottom chassis 140 is directly coupled to the top chassis 130. In other alternative exemplary embodiments, the top chassis 130 and bottom chassis 140 may be coupled to each other through the mid mold 150, and thus not directly coupled to each other. That is, the top chassis 130 and the bottom chassis 140 may be mutually connected to each other because each of the top chassis 130 and the bottom chassis 140 is independently connected to the mid mold 150.

The bottom chassis 140 also performs a function of discharging to the outside the heat generated by the light sources 122. That is, the bottom chassis 140 also functions as a heat sink for cooling the light sources 122. To this end, the bottom chassis 140 is advantageously made of a metal material of high heat conductivity, such as, for example, aluminum, stainless steel etc.

The bottom chassis 140 has a strength reinforcing member 160 mounted onto an internal surface 141 of the bottom chassis 140. The strength reinforcing member 160 is covered by a cover member 170. Herein, the strength reinforcing member 160 reinforces of the bottom chassis 140, making the bottom chassis 140 stronger thereby preventing deformation of the bottom chassis 140. By such a strength reinforcing member 160, the bottom chassis 140 becomes able to maintain a good flatness.

Figure 3:
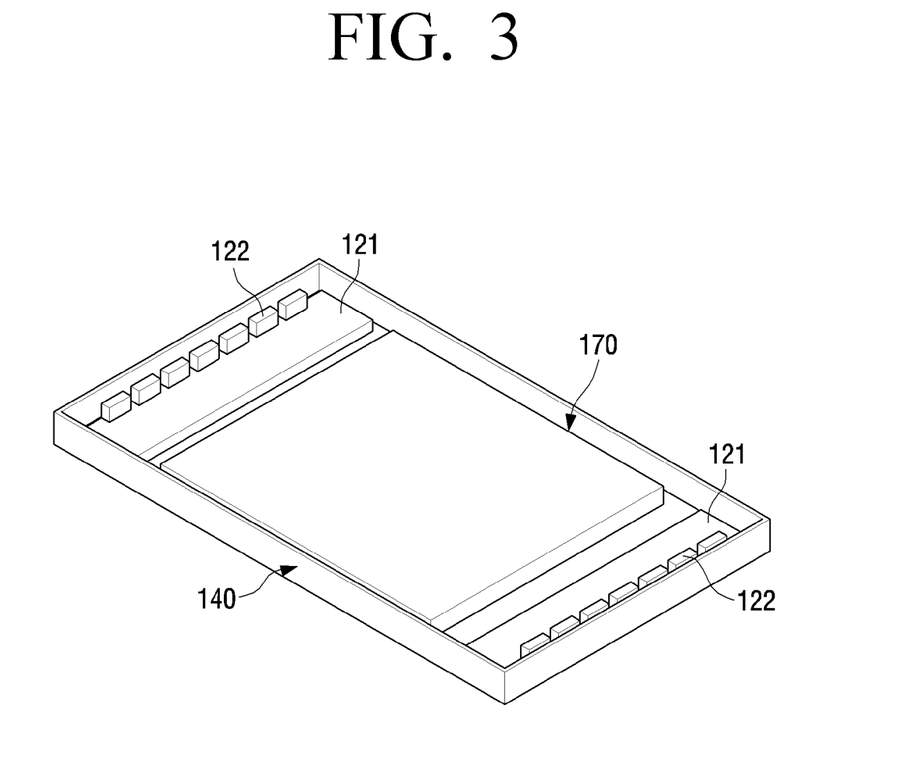
FIG. 3 is a perspective view illustrating a bottom chassis and components mounted to the bottom chassis, provided in the liquid crystal display apparatus of FIG. 1.
Figure 4:
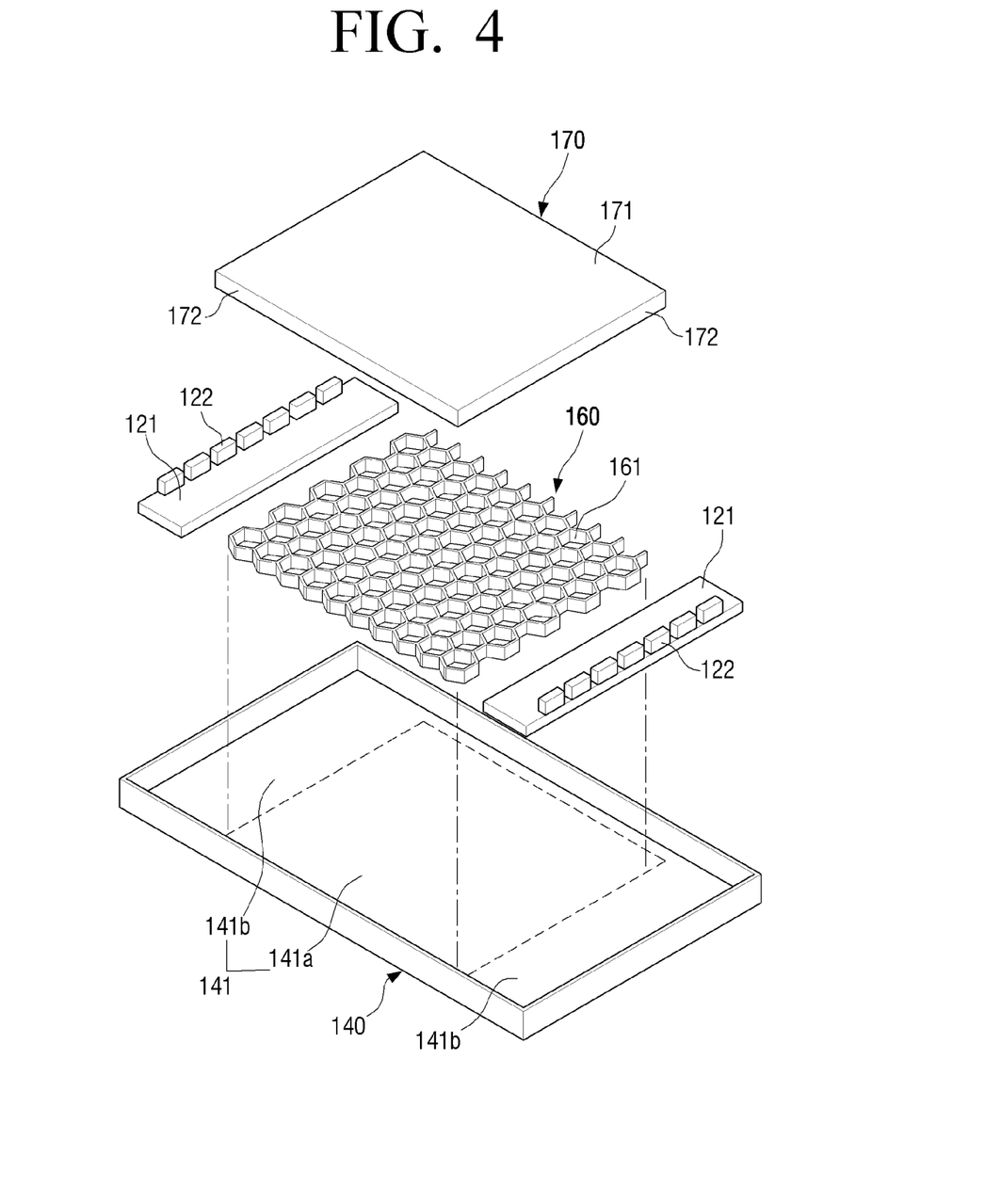
FIG. 4 is a perspective view illustrating dissembled components of FIG. 3.

Referring to FIG. 3 and FIG. 4, the strength reinforcing member 160 and the cover member 170 will be described more detail.

FIG. 3 is a perspective view illustrating the bottom chassis, and components mounted to the bottom chassis, provided in the liquid crystal display apparatus of FIG. 1, and FIG. 4 is a perspective view illustrating dissembled components of FIG. 3.

With reference to FIGS. 3 and 4, the strength reinforcing member 160 is placed in a central portion of the bottom chassis 140. Therefore, the internal surface 141 of the bottom chassis 140 is divided into an occupied area 141a which is occupied by the strength reinforcing member 160 and a non-occupied area 141b which is not occupied by the strength reinforcing member 160. Herein, in FIG. 4, the occupied area 141a is expressed in virtual rectangular dotted lines, and a shape and size area of the occupied area 141a may change according to a shape and area of the strength reinforcing member 160. In the non-occupied area 141b, two light source PCBs 121 are mounted, and the strength reinforcing member 160 is provided therebetween. Thus, one light source PCB 121 is provided on each side of the strength reinforcing member 160. Note that alternatively there may be a plurality of light source PCBs 121, such that each side of the strength reinforcing member has multiple light source PCBs. On each of the light source PCBs 121, a plurality of light sources 122 are arranged.

The strength reinforcing member 160 is attached to the bottom chassis 140 by, for example, an adhesive such as a hot melt adhesive. As illustrated in FIG. 4, the strength reinforcing member 160 has a plurality of cells 161, wherein each cell has a shape of a hexagonal column. Therefore, the strength reinforcing member 160 has an overall shape of a honeycomb. However, this is only an example, and in other alternative exemplary embodiments, a shape of each cell 161 may be changed to have other various shapes, for example other columnar shapes, for example, a tetragonal column shape or a cylindrical shape etc.

The strength reinforcing member 160 is made of aluminum, and may be advantageously made of aluminum with high strength. However, it is not limited thereto, and thus the strength reinforcing member 160 may be made of other metal materials or non-metal materials, such as, for example, plastic.

As such, the strength reinforcing member 160 having a shape of a honeycomb may be mounted to the bottom chassis 140, thereby significantly reinforcing of the bottom chassis 140 and improving the strength properties of the bottom chassis 140. Accordingly, the deformation of the bottom chassis 140 by weight, external force, or heat etc. may be minimized, so a good flatness of the bottom chassis 140 can be maintained. Thus, it is possible to prevent deterioration of the quality of images displayed by the liquid crystal panel 110 that would otherwise be caused by such deformation of the bottom chassis 140.

In addition, since the strength reinforcing member 160 does not increase the thickness of the bottom chassis 140 in order to achieve an improvement in the strength properties of the bottom chassis 140, and since the strength reinforcing member 160 is attached to the bottom chassis 140 relatively simply through an adhesive, it is possible to improve the strength properties of the bottom chassis 140 while maintaining a low manufacturing cost and high productivity.

Even when the liquid crystal display apparatus 100 is applied to a large size display apparatus, for example a television of 55 inches or more, it is possible to maintain a good flatness of the bottom chassis 140 by means of the aforementioned strength reinforcing member 160. In the case of such a large size display apparatus, the size area of the bottom chassis 140 becomes significantly large, and thus it is advantageous to prevent deformation of the bottom chassis 140 and maintain a good flatness thereof.

The cover member 170 covers the strength reinforcing member 160 so that the strength reinforcing member 160 is not exposed. Accordingly, the cover member 170 includes an upper portion 171 which covers the upper side of the strength reinforcing member 160 and a side portion 172 which covers the border of the strength reinforcing member 160. For example, the side portion 172 may be formed through a bending process. The cover member 170 may be made of a same material as the strength reinforcing member 160. Therefore, the cover member 170 may be made of, for example, aluminum. In addition, the cover member 170 is attached to the strength reinforcing member 160, for example, by an adhesive such as hot melt.

Since the strength reinforcing member 160 is covered by the cover member 170, pollutants that may exist in the strength reinforcing member 160 and that may cause a deterioration in the performance of the liquid crystal display apparatus 100 may be prevented from entering the liquid crystal display apparatus 100. For example, particles generated during processing of or formation of the strength reinforcing member 160 may be examples of such a pollutant. Moreover, with reference to FIG. 2, the cover member 170 may also perform a function of supporting components such as the light guide plate 120 placed in its upper side.

Figure 5:
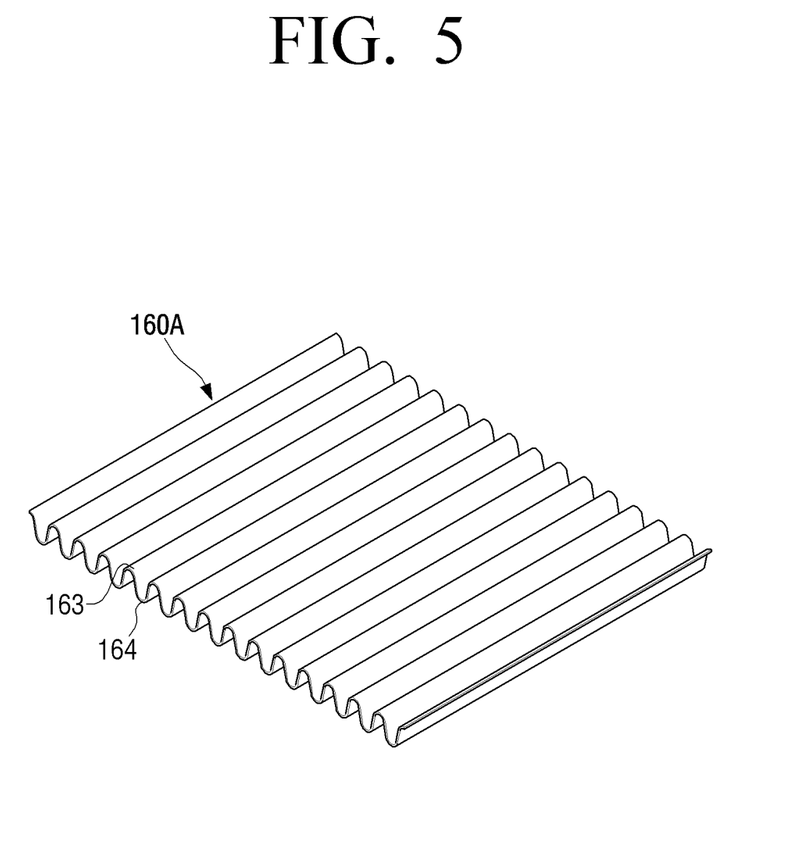
FIG. 5 is a perspective view illustrating a strength reinforcing member provided in the liquid crystal display apparatus of FIG. 1 according to an exemplary embodiment.
Figure 6:
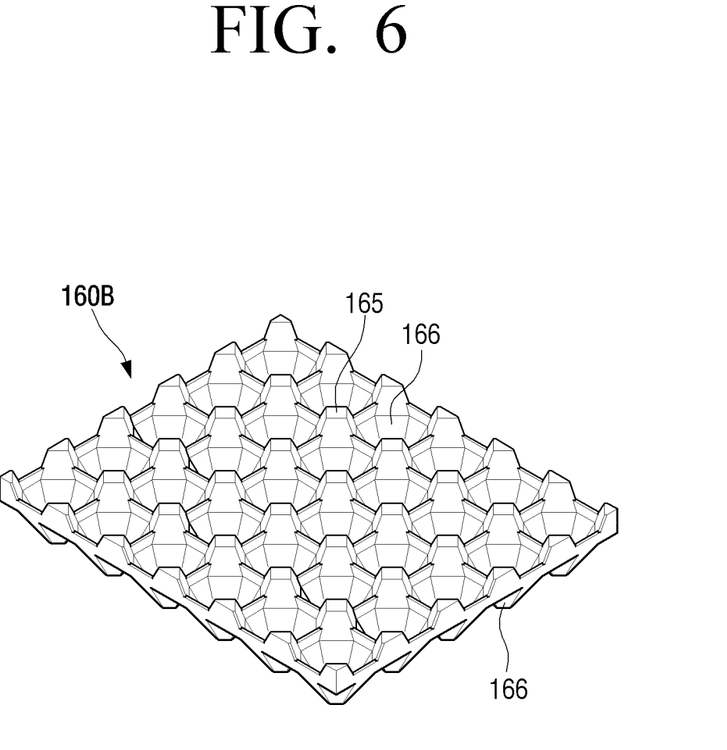
FIG. 6 is a perspective view illustrating a strength reinforcing member provided in the liquid crystal display apparatus of FIG. 1 according to another exemplary embodiment.

FIG. 5 is a perspective view illustrating a strength reinforcing member provided in the liquid crystal display apparatus of FIG. 1 according to an alternative exemplary embodiment, and FIG. 6 is a perspective view illustrating a strength reinforcing member provided in the liquid crystal display apparatus of FIG. 1 according to another alternative exemplary embodiment.

With reference to FIG. 5, the alternative strength reinforcing member 160A has a shape of a wave. More particularly, the strength reinforcing member 160A has a structure where convex portions 163 and concave portions 164 are repeated in turns. Herein, the convex portions 163 and concave portions 164 are extended along a width direction or longitudinal direction of the strength reinforcing member 160A. That is, a concave portion 164 is placed between two convex portions 163, and a convex portion 163 is placed between two concave portions 163.

With reference to FIG. 6, another alternative strength reinforcing member 160B has a shape of an egg container. More particularly, the strength reinforcing member 160B has a plurality of convex portions 165 and a plurality of concave portions 166 which are repeated regularly in a two dimensional array, and a concave portion 166 is placed between four convex portions 165, and a convex portion 166 is placed between four concave portions 165.

In this disclosure, three strength reinforcing members 160, 160A, 160B having different shapes are introduced, but other strength reinforcing members having other shapes may be used as long as they contribute to improvement of a strength property of the bottom chassis 140.

Figure 7:
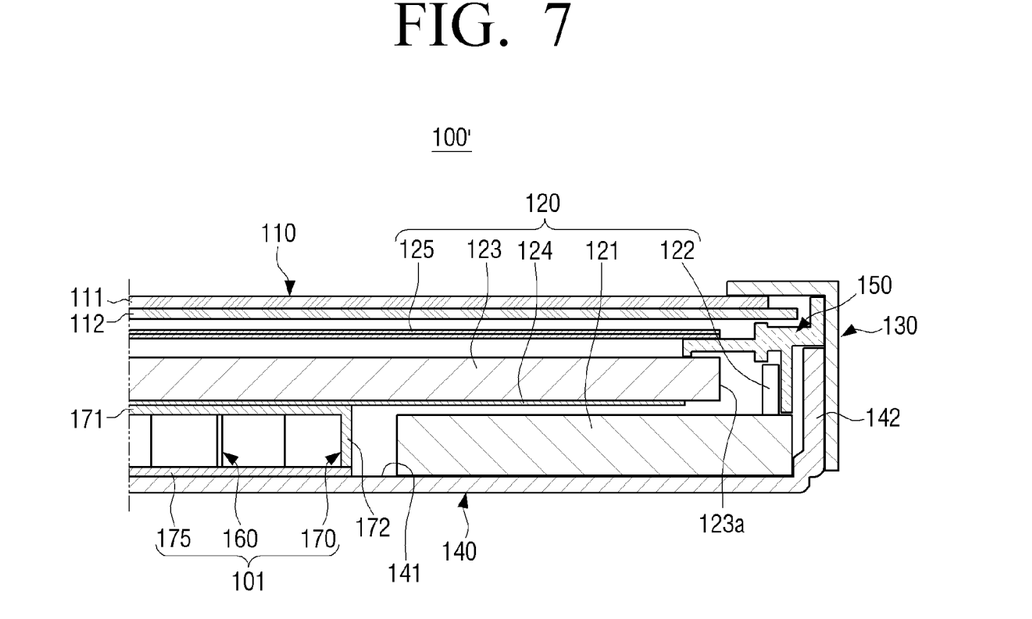
FIG. 7 is a similar view to FIG. 2, which illustrates a cross-sectional view of a liquid crystal display apparatus according to a second exemplary embodiment.

FIG. 7 is a similar view to FIG. 2, which illustrates a cross-sectional view of a liquid crystal display apparatus according to a second exemplary embodiment.

The configuration of the liquid crystal display apparatus 100' illustrated in FIG. 7 is similar to the configuration of the liquid crystal display apparatus 100 illustrated in the aforementioned FIG. 1. However, in the case of the aforementioned liquid crystal display apparatus 100, the strength reinforcing member 160 is attached directly to the bottom chassis 140, whereas in the case of the liquid crystal display apparatus 100', there is a difference that the strength reinforcing member 160 is mounted to the bottom chassis 140 through an additional lower side cover member 175.

As such, the liquid crystal display apparatus 100' further includes a lower side cover member 175 in addition to the upper side cover member 170, and the strength reinforcing member 60 is surrounded by the upper side cover member 170 and the lower side cover member 175. In such a case, the lower side cover member 175, strength reinforcing member 160, and upper side cover member 170 may be attached sequentially on the bottom chassis 140, but the lower side cover member 175, strength reinforcing member 160, and upper side cover member 170 may also be mutually and individually bonded to each other first to form one strength reinforcing unit 101, and then bonded to the bottom chassis 140 at once by use of an adhesive, such as an adhesive tape or other such bonding method. The formation first of one strength reinforcing unit 101 has an advantage of simplifying the manufacturing process of the liquid crystal display apparatus 100'.

Figure 8:
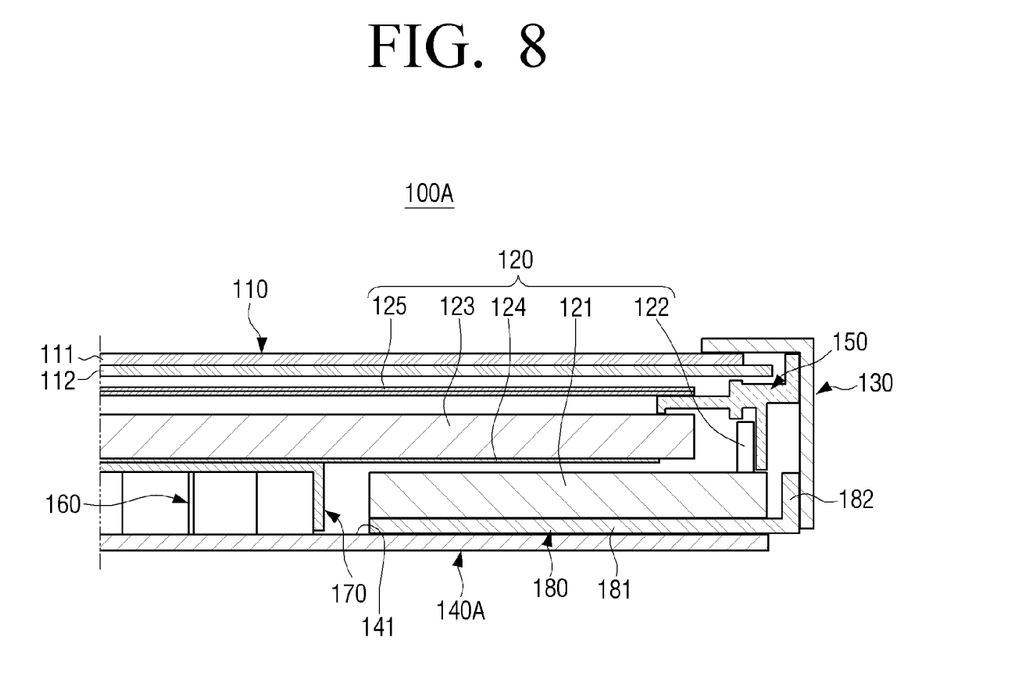
FIG. 8 is a similar view to FIG. 2, which illustrates a cross-sectional view of a liquid crystal display apparatus according to third exemplary embodiment.

FIG. 8 is FIG. 8 is a similar view to FIG. 2, which illustrates a cross-sectional view of a liquid crystal display apparatus according to third exemplary embodiment.

With reference to FIG. 8, an alternative liquid crystal display apparatus 100A is similar to the configuration of the liquid crystal display apparatus 100 illustrated in the aforementioned FIG. 1. Especially, the alternative liquid crystal display apparatus 100A is similar to the liquid crystal display apparatus 100 of FIG. 1 in that a strength reinforcing member 160 for strength reinforcement is mounted to the bottom chassis 140A.

The difference of the liquid crystal display apparatus 100A from the aforementioned liquid crystal display apparatus 100 is that the liquid crystal display apparatus 100A further includes a heat sink 180 placed between a light source PCB 121 and the bottom chassis 140A. The heat sink 180 is made of a material, for example, aluminum, having a high thermal conductivity, to further effectively deliver the heat generated by the light sources 122 to the bottom chassis 140A.

Such a heat sink 180 includes a body part 181 which supports the light source PCB 121 and a coupling part 182 substantially orthogonal to the body part 181. The coupling part 182 is fastened to the top chassis 130 by a fastener, thereby being directly coupled to the top chassis 130. In other alternative exemplary embodiments, the heat sink 180 may be alternatively directly coupled to the mid mold 150.

Figure 9:
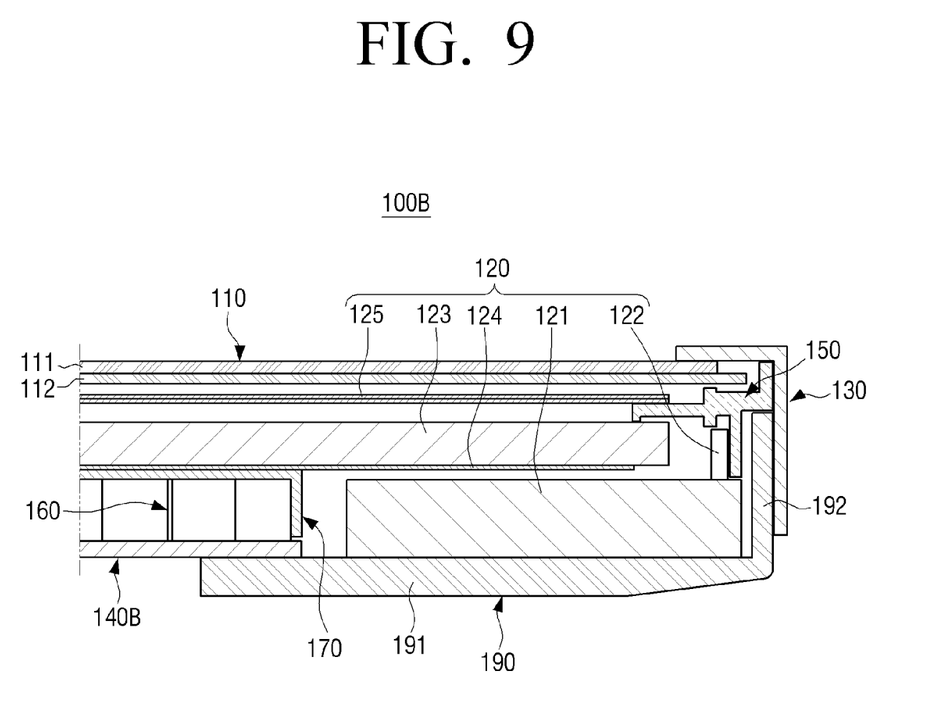
FIG. 9 is a similar view to FIG. 2, which illustrates a cross-sectional view of a liquid crystal display apparatus according to fourth exemplary embodiment.

FIG. 9 is a similar view to FIG. 2, which illustrates a cross-sectional view of a liquid crystal display apparatus according to fourth exemplary embodiment.

With reference to FIG. 9, another alternative liquid crystal display apparatus 100B is also similar to the aforementioned liquid crystal display apparatus 100 illustrated in FIG. 1. Specifically, the liquid crystal display apparatus 100B is similar to the liquid crystal display apparatus 100 of FIG. 1 in that a strength reinforcing member 160 for strength reinforcement is mounted to a bottom chassis 140B.

The difference of the liquid crystal display apparatus 100B from the aforementioned liquid crystal display apparatus 100 is that the liquid crystal display apparatus 100B further includes a heat sink 190 placed at a rear side of the bottom chassis 140B. The heat sink 190 is made of a material, for example, aluminum, having a high thermal conductivity, to further effectively deliver the heat generated by the light sources 122 to the outside.

Such a heat sink 190 includes a body part 191 and a coupling part 192. The body part 191 supports not only a light source PCB 121 but also the bottom chassis 140B. Since the light source PCB 121 is not supported by the bottom chassis 140B directly, compared to other exemplary embodiments, the size (e.g., the width in the right to left direction in FIG. 1, or the area, etc.) of the bottom chassis 140B may be reduced. For example, the width of the bottom chassis 140B may be reduced to be the same as the width of the cover member 170. Moreover, since the coupling part 192 is fastened to the top chassis 130 by a fastener (not illustrated) such as a screw, the heat sink 190 may be directly coupled to the top chassis 130.

In alternative exemplary embodiments, the heat sink 190 may be alternatively directly fastened to the mid mold 150.

Figure 10:
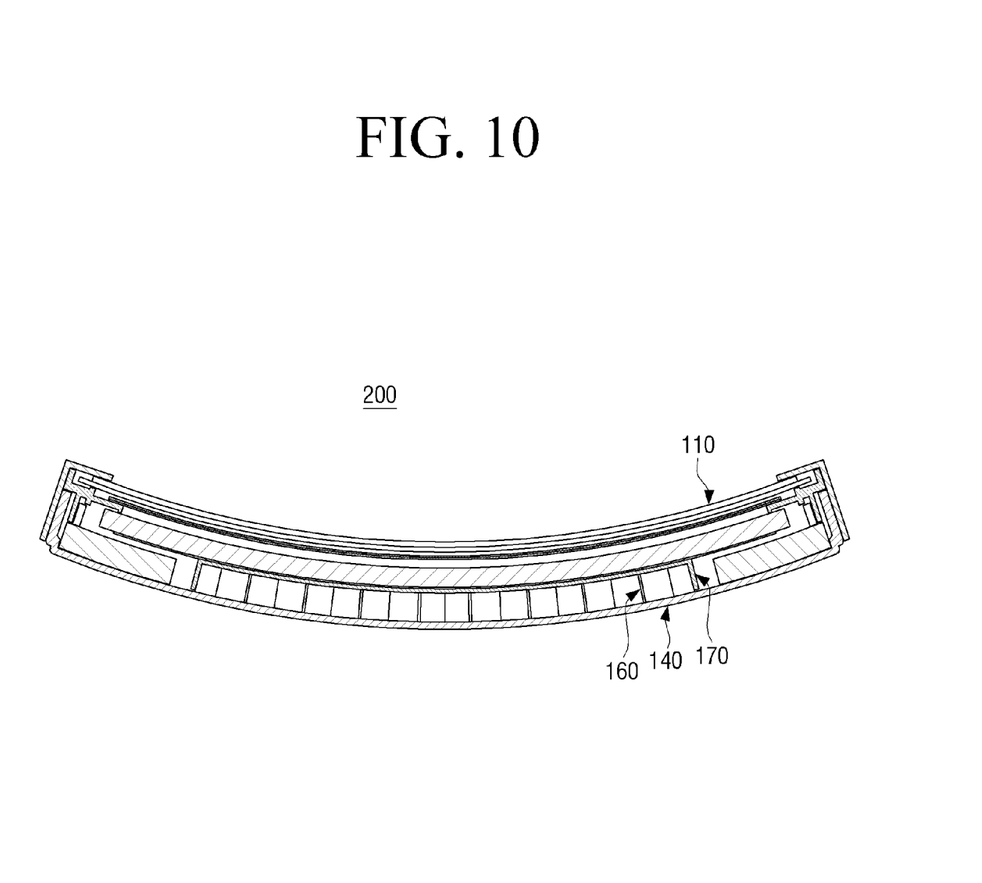
FIG. 10 is a cross-sectional view illustrating a liquid crystal display apparatus according to a fifth exemplary embodiment.
Figure 11:
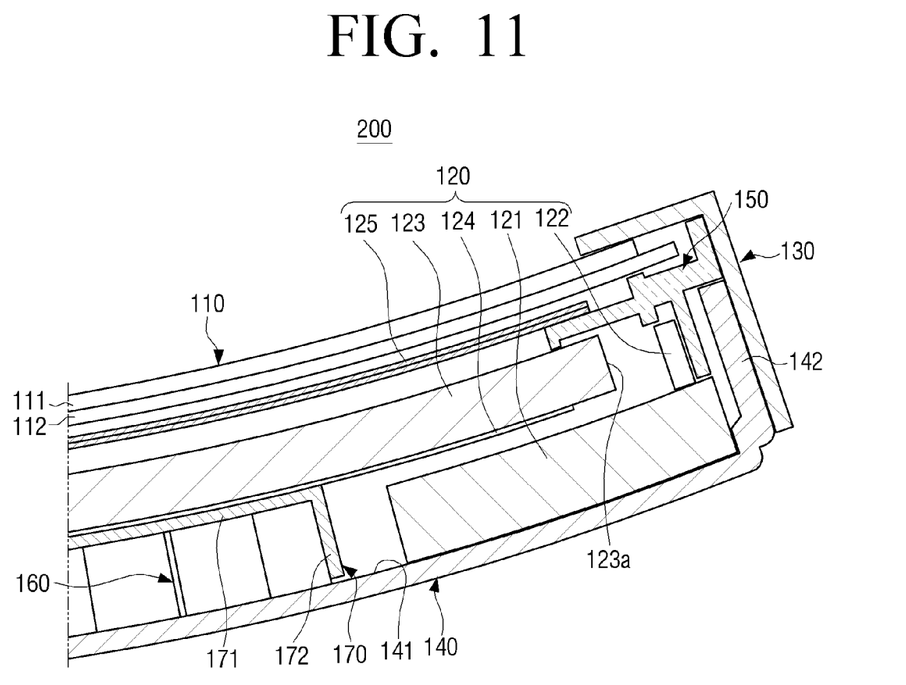
FIG. 11 is an enlarged cross-sectional view of a right end portion of the liquid crystal display apparatus illustrated in FIG. 10.

FIG. 10 is a cross-sectional view illustrating a liquid crystal display apparatus according to a fifth exemplary embodiment, and FIG. 11 is an enlarged cross-sectional view of a right end portion of the liquid crystal display apparatus illustrated in FIG. 10.

With reference to FIGS. 10 and 11, the liquid crystal display apparatus 200 according to a fifth exemplary embodiment is a curved display apparatus, unlike the aforementioned liquid crystal display apparatuses.

Compared to the liquid crystal display apparatus 100 (see FIGS. 1 and 2) according to the first exemplary embodiment, the detailed configuration of the liquid crystal panel 110, the backlight unit 120, the top chassis 130, the bottom chassis 140, the mid mold 150, and the strength reinforcing member 160 of the liquid crystal display apparatus 200 are provided in substantially the same manner as those of the aforementioned liquid crystal display apparatuses 100, but since the liquid crystal display apparatus 200 is a curved surface display with a curvature, the liquid crystal panel 110, the backlight unit 120, the top chassis 130, the bottom chassis 140, the mid mold 150, and the strength reinforcing member 160 of the liquid crystal display apparatus 200 are formed to conform to such a curvature.

As discussed above, in the fifth exemplary embodiment, the bottom chassis 140 of the liquid crystal display apparatus 200 is also formed to conform to such a curvature. It is thus advantageous for the bottom chassis 140 to have good strength performance and properties so as to maintain the curvature.

Various methods may be applied to manufacture the liquid crystal display apparatus 200 in a curved shape. For example, a manufacturing method may be used where, after manufacturing a bottom chassis 140 of a curved surface shape, a top chassis 130 of a non-curved surface shape is assembled to the bottom chassis 140, thereby having other components such as the top chassis 130, etc. to conform to the curvature of the bottom chassis 140. In such a method, if the strength of the bottom chassis 140 is not sufficient, it may be difficult to maintain the curved surface shape of the liquid crystal display apparatus 200, and thus good strength performance of the bottom chassis 140 is advantageous.

Accordingly, a strength reinforcing member 160 of a honeycomb shape is mounted to the internal surface 141 of the bottom chassis 140, for reinforcing the strength of the bottom chassis 140. As aforementioned, the strength of the bottom chassis 140 where the strength reinforcing member 160 of a honeycomb shape is attached may be reinforced significantly, and accordingly, even when a weight, external force, or heat, etc. are applied to the liquid crystal display apparatus 200, the liquid crystal display apparatus 200 may maintain the initial curvature with stability. Therefore, it is possible to prevent the quality of the images provided by the liquid crystal display apparatus 200 from being deteriorated due to deformation of the bottom chassis 140 from the original manufactured curvature.

The fifth exemplary embodiment was describe as having a strength reinforcing member 160 having a honeycomb shape as the shape of the strength reinforcing member 160, but as aforementioned, a wave shape, or egg carton shape, etc. may also be applied as an alternative shape of the strength reinforcing member 160.

As aforementioned, according to the present disclosure, a strength reinforcing member may be mounted to a bottom chassis, to significantly improve the strength of the bottom chassis, thereby minimizing deformation of the bottom chassis due to weight, external force, and heat, etc. Therefore, in a case where the present disclosure is applied to a flat panel display apparatus, it is possible to maintain a good flatness of the flat panel display apparatus, and in a case where the present disclosure is applied to the curved display apparatus, it is possible to maintain the initial curvature with stability. Consequently, it is possible to prevent deterioration, caused by excessive deformation of the bottom chassis, of the quality of the images that the display apparatus provides.

In the case of a large size liquid crystal display apparatus, for example, a television of 55 inches or more, the area of the bottom chassis also increases, and thus it becomes advantageous to prevent deformation of the bottom chassis. Therefore, the liquid crystal display apparatus according to the present disclosure may be applied to such a large size display apparatus particularly advantageously.

Although a few embodiments of the present invention have been shown and described, it would be appreciated by those skilled in the art that changes may be made to these exemplary embodiments without departing from the principles and spirit of the inventive concept, the scope of which is defined in the claims and their equivalents.

What is claimed is:

1. A liquid crystal display apparatus comprising:
    a liquid crystal panel which is configured to display an image;
    a backlight unit which is configured to supply light for displaying the image on the liquid crystal panel;
    a top chassis and a bottom chassis which package the liquid crystal panel and backlight unit in one module;
    a strength reinforcing member which is mounted to an internal surface of the bottom chassis; and
    a cover member including an upper portion, which covers the strength reinforcing member, and a side portion disposed on a side of the strength reinforcing member,
    wherein the backlight unit comprises at least one light source printed circuit board (PCB) on which a plurality of light sources are mounted,
    the strength reinforcing member occupies a first area of the internal surface of the bottom chassis, and the at least one light source PCB is attached to a second area of the internal surface of the bottom chassis which is not occupied by the strength reinforcing member, and
    the strength reinforcing member is disposed laterally with respect to the at least one light source PCB, so that a surface of the side portion is disposed laterally and in proximity to the at least one light source PCB.

2. The liquid crystal display apparatus according to claim 1, wherein the strength reinforcing member has a shape of a honeycomb where a plurality of cells are formed.

3. The liquid crystal display apparatus according to claim 2, wherein each cell of the strength reinforcing member has a shape of a hexagonal column.

4. The liquid crystal display apparatus according to claim 1, wherein the strength reinforcing member has a shape of a wave.

5. The liquid crystal display apparatus according to claim 1, wherein the strength reinforcing member has a shape of an egg carton.

6. The liquid crystal display apparatus according to claim 5, wherein the strength reinforcing member comprises a plurality of convex portions and a plurality of concave portions, and wherein a concave portion is placed between four convex portions and a convex portion is placed between four concave portions.

7. The liquid crystal display apparatus according to claim 1, wherein the cover member is attached to the strength reinforcing member.

8. The liquid crystal display apparatus according to claim 7, wherein the strength reinforcing member and the bottom chassis are attached by an adhesive, and the cover member and the strength reinforcing member are attached by an adhesive.

9. The liquid crystal display apparatus according to claim 8, wherein the adhesive is a hot melt adhesive.

10. The liquid crystal display apparatus according to claim 1, wherein a heat sink for transmitting heat generated by the light sources to the bottom chassis is placed between the at least one light source PCB and the bottom chassis.

11. The liquid crystal display apparatus according to claim 10, wherein the heat sink is directly fastened to the top chassis.

12. The liquid crystal display apparatus according to claim 1, wherein the strength reinforcing member is made of aluminum.

13. The liquid crystal display apparatus according to claim 1, wherein the liquid crystal display apparatus is a large size television of 55 inches or more.

14. A curved display apparatus comprising:
    a liquid crystal panel which is configured to display an image;
    a backlight unit which is configured to supply light for displaying the image on the liquid crystal panel;
    a top chassis and bottom chassis which package the liquid crystal panel and backlight unit in one module;
    a strength reinforcing member which is attached to an internal surface of the bottom chassis; and
    a cover member including an upper portion, which covers the strength reinforcing member, and a side portion disposed on a side of the strength reinforcing member,
    wherein the backlight unit comprises at least one light source printed circuit board (PCB) on which a plurality of light sources are mounted,
    the strength reinforcing member occupies a first area of the internal surface of the bottom chassis, and the at least one light source PCB is attached to a second area of the internal surface of the bottom chassis which is not occupied by the strength reinforcing member,
    the strength reinforcing member is disposed laterally with respect to the at least one light source PCB, so that a surface of the side portion is disposed laterally and in proximity to the at least one light source PCB,
    the curved display apparatus is curved with a curvature, and
    the liquid crystal panel, the backlight unit, the top chassis, the bottom chassis, and the strength reinforcing member are each formed with the curvature.

15. The curved display apparatus according to claim 14, wherein the strength reinforcing member has a shape of a honeycomb having a plurality of cells.

* * * * *